United States Patent

[11] 3,577,022

[72] Inventor Siegfried H. Hasinger
     Dayton, Ohio
[21] Appl. No. 1,005
[22] Filed Jan. 6, 1970
[45] Patented May 4, 1971
[73] Assignee The United States of America as represented by the Secretary of the Air Force

[54] THERMOBALLISTIC GENERATOR
     7 Claims, 16 Drawing Figs.
[52] U.S. Cl. ........................................... 310/10
[51] Int. Cl. ....................................... H02n 3/00
[50] Field of Search ........................... 310/10, 11, 5, 6; 55/2—12; 204/312

[56] References Cited
     UNITED STATES PATENTS

| | | | |
|---|---|---|---|
| 3,191,077 | 6/1965 | Marks et al. | 310/5 |
| 3,225,225 | 12/1965 | Wattendorf et al. | 310/6 |
| 3,297,887 | 1/1967 | Marks | 310/4 |
| 3,411,025 | 11/1968 | Marks | 310/11 |
| 3,417,267 | 12/1968 | Marks | 310/6 |
| 3,465,180 | 9/1969 | Von Ohain et al. | 310/11 |
| 3,518,461 | 6/1970 | Marks | 310/10 |

*Primary Examiner*—D. X. Sliney
*Attorneys*—Harry A. Herbert, Jr. and Robert Kern Duncan ABSTRACT: Jets of high energy supercritical steam in a disintegrated state containing a small percentage of conductive colloidal particles are inductively electrically charged, then evaporated, in a fillgas mixture of steam and hydrogen transferring electrical charge to the colloids. After the evaporation the hydrogen and water vapor carrying the charged colloids are accelerated to a supersonic speed in expansion nozzles such that a wet vapor condition occurs and condensation takes place with the charged colloids acting as condensation nuclei. The condensation nuclei are kept from contacting the expansion nozzle walls by a sheath composed of the fillgas. The charged condensation droplets at constant or with slightly increased environmental pressure then traverse a conversion space of suddenly increased cross section of determined size, from a ground potential plane to a plurality of collector electrode plates converting an essential part of their kinetic energy into electrical energy. They deposit their electrical charge thereon raising the collector to a high potential. Recirculation of hydrogen and steam through the conversion region assists in the conversion process as a cooling and transport medium. Electrical power at relatively high voltages and low currents between the collector electrode and ground potential is generated for utilization.

INVENTOR.
SIEGFRIED H. HASINGER
BY Harry A. Herbert Jr
Robert Kern Duncan
ATTORNEYS

INVENTOR.
SIEGFRIED H. HASINGER

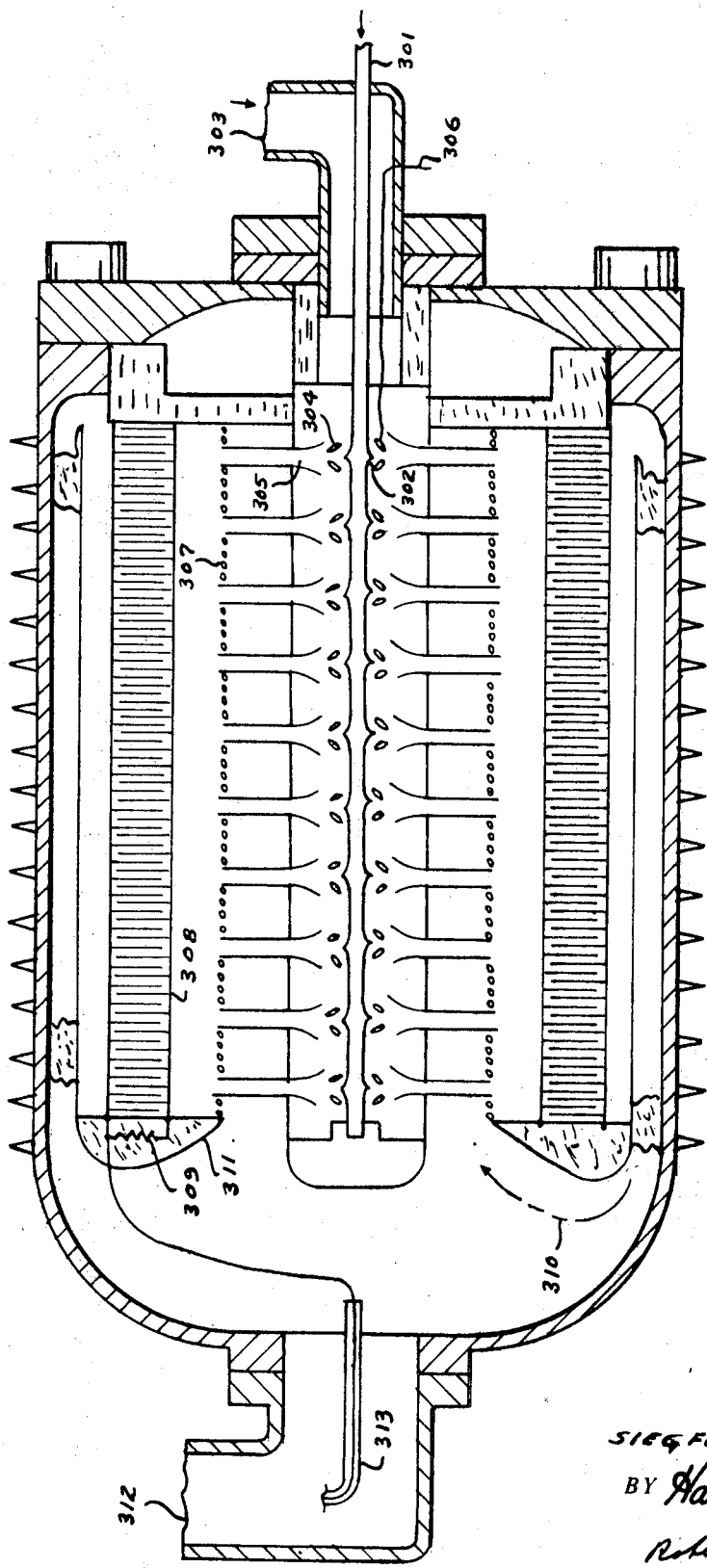

THERMOBALLISTIC GENERATOR

BACKGROUND OF THE INVENTION

The field of the invention is in electrofluid dynamic generators.

Electrofluid dynamic generating devices with various methods of producing the charged particles utilized therein are known. In one method condensation around ions in an expanding gas flow is used. Another method consists in mechanically or electrically dispersing charged liquid jets. The condensation method yields particles which are in general too small for the ballistic generator process, which must be carried out in a high pressure atmosphere for good electric insulation. This method also requires a complicated ion source. Mechanical dispersion of a jet yields much too large droplets and in addition produces a wide variation in droplet size. Electric dispersion, as is also well known in paint spraying, produces a more favorable droplet size, however, the particles would be formed in full size before they could be accelerated for conversion process. The acceleration of such large particles by means of a gas flow causes appreciable losses due to slip between the particles and the expanding gas flow.

The prior art in this field is set forth by the following U.S. Pat. Nos. listed with their respective patentees: 3,476,959, Maurice O. Lawson; 3,465,180, Hans J. P. von Ohain et al.; 3,417,267, Alvin M. Marks; 3,411,025, Alvin M. Marks; 3,297,887, Alvin M. Marks; 3,225,225, Frank L. Wattendorf et al.; and 3,191,077, Alvin M. Marks et al.

SUMMARY OF THE INVENTION

Electric power is generated from the energy of a heat source through the transformation of the kinetic energy of a high temperature, high pressure, gas-fluid flow directly into electrical energy. The generator receives a fluid such as supercritical steam that contains a small amount of conductive colloids, such as dispersed silver, and a fillgas, such as superheated steam mixed with a small amount of a lightweight gas such as hydrogen. The colloids are inductively electrically charged, accelerated, effectively enlarged by a condensation process, and ballistically transported through a conversion space wherein the kinetic energy is transformed into electrical energy and the charges deposited on a collector electrode from which electrical energy may be extracted.

BRIEF DESCRIPTION OF THE DRAWINGS

FIG. 11 is a sectional view of an embodiment of a thermoballistic generator having a plurality of radial jets in a vertical column;

DESCRIPTION OF THE PREFERRED EMBODIMENTS

Figure 1:
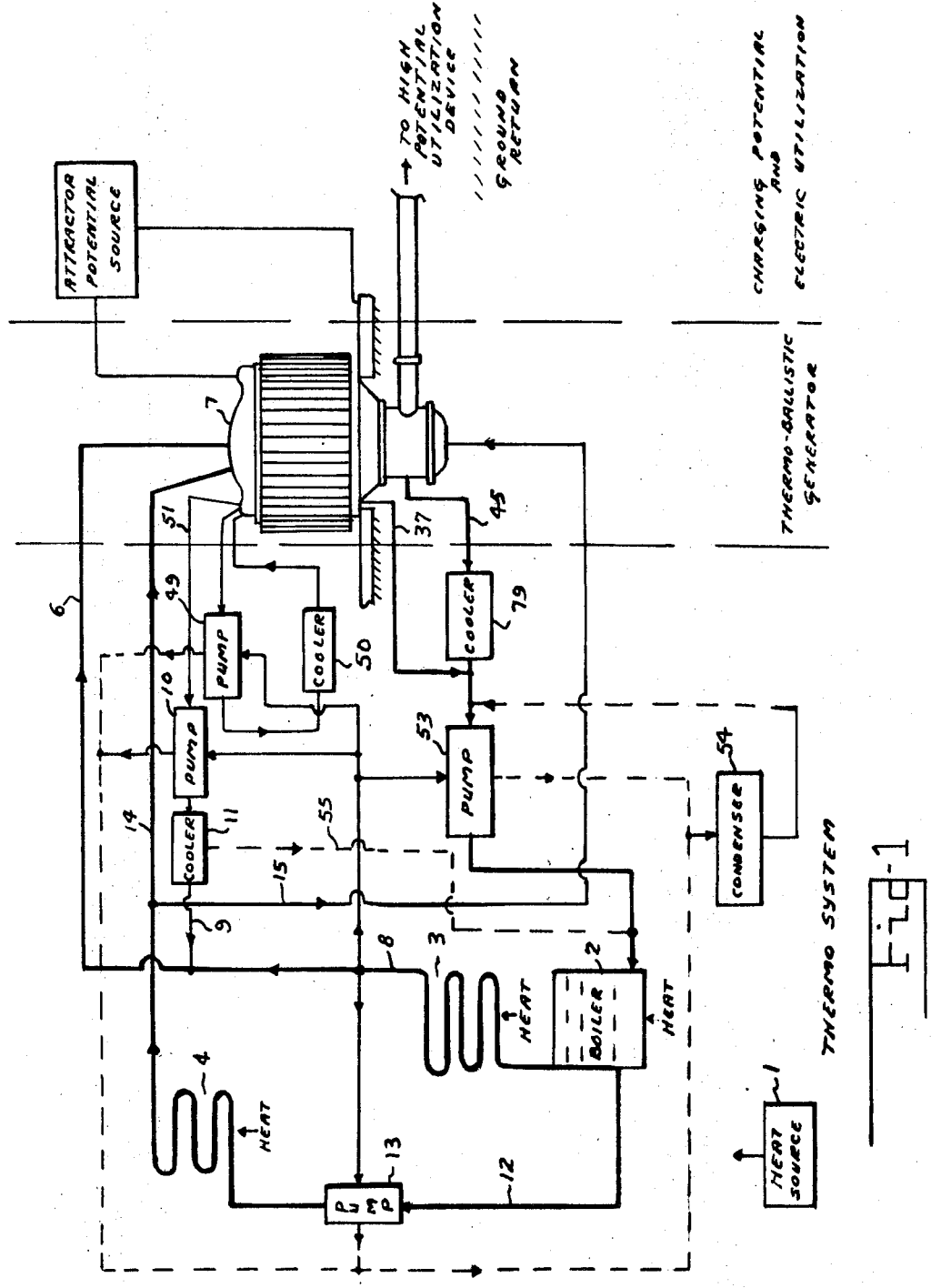
FIG. 1 is a block-pictorial drawing of a complete thermoballistic generating system.

A. Theory of Operation of the Conversion Chamber

The fundamental principle employed in the ballistic generator is that of transporting a particle having a mass $m$ and a charge $q$ through a conversion region in which the charged particle is made to travel from an entrance electrode of one polarity toward an exit electrode of the opposite polarity, for example, a positively charged particle traveling from a negative polarity region to a positive exit electrode. In traveling toward the exit electrode the particle is decelerated by electric forces. The loss in kinetic energy of the particle is transformed into electric energy due to the fact that the electric charge has been brought nearer to the equally charged exit electrode and has thus reached a higher electric potential. With sufficient kinetic energy, the particle will reach the exit electrode where it can deposit its charge. From this collecting electrode, the charge can return in an external circuit to the negative electrode thereby doing useful work in an electric apparatus.

The balance between the kinetic and electrical energy in the conversion region of the ballistic generator of a charged particle having a charge $q$, a mass $m$, an entrance velocity $v_1$, a terminal velocity $v_2$, transported to a potential $V$ is expressed by:

$$\tfrac{1}{2}m(v_1^2 - v_2^2) = q \cdot V.$$

The particle must have sufficient velocity $v_2$ at the end of the conversion region in order to account for deviations in charge-to-mass ratio of the particle, to facilitate its removal from the generator and return to the external thermodynamic system, and as will be further explained, to avoid excessive space charge concentrations ahead of the exit electrode. This exit energy represents a loss for the conversion process. Some of this loss may effectively be recouped in the closed cycle system due to a lessened amount of energy required to carry on the fluid flow. In general this exit loss amounts to approximately 25 percent of the particle entrance energy. This means that the particle velocity drops to essentially half during the conversion process. Thus the foregoing equation with $v_2 = v_1/2$ takes on the form:

$$V = (3/8)\left(\frac{m}{q}\right)v_1^2$$

The thermodynamic cycle, which is in general the source of energy for the acceleration of the particles, sets the upper limit for the gas velocity and thus for the particle velocity. At a given temperature $T$, the random kinetic energy $H$ per unit mass of molecule is:

$$H = (\tfrac{1}{2}) R \cdot T \cdot n$$

where $R$ is the special gas constant and $n$ is the number of degrees of freedom for storage of kinetic energy in the molecule. The energy $H$ is able to give the mass with which it is associated the velocity:

$$\sqrt{v} = n_{th} \cdot R \cdot T \cdot n$$

where $n_{th}$ is the thermal conversion efficiency. For example, taking $1,000°$ K as a practical temperature and $n_{th} = 0.25$, the lightest gas, hydrogen, obtains a speed of 2,700 m/s, and for the very heavy mercury vapor it is only 230 m/s. Obviously, the choice of the operating medium will be strongly influenced by requirements imposed by the thermodynamic process. In this case where condensation droplets are used as particles, the use of a light molecular weight gas as an additive is advantageous; the noncondensing lightweight gas due to its inherently high specific heat is a very good cooling agent for the condensing vapor. As will be further explained, the addition to the charged liquid of small, (less than one-tenth micron) nonevaporating, conductive particles to serve as condensation nuclei as the expansion goes into the wet vapor region greatly reduces condensation delays and enhances the formation of large particles thus greatly increasing the efficiency of the generator.

Figure 13:
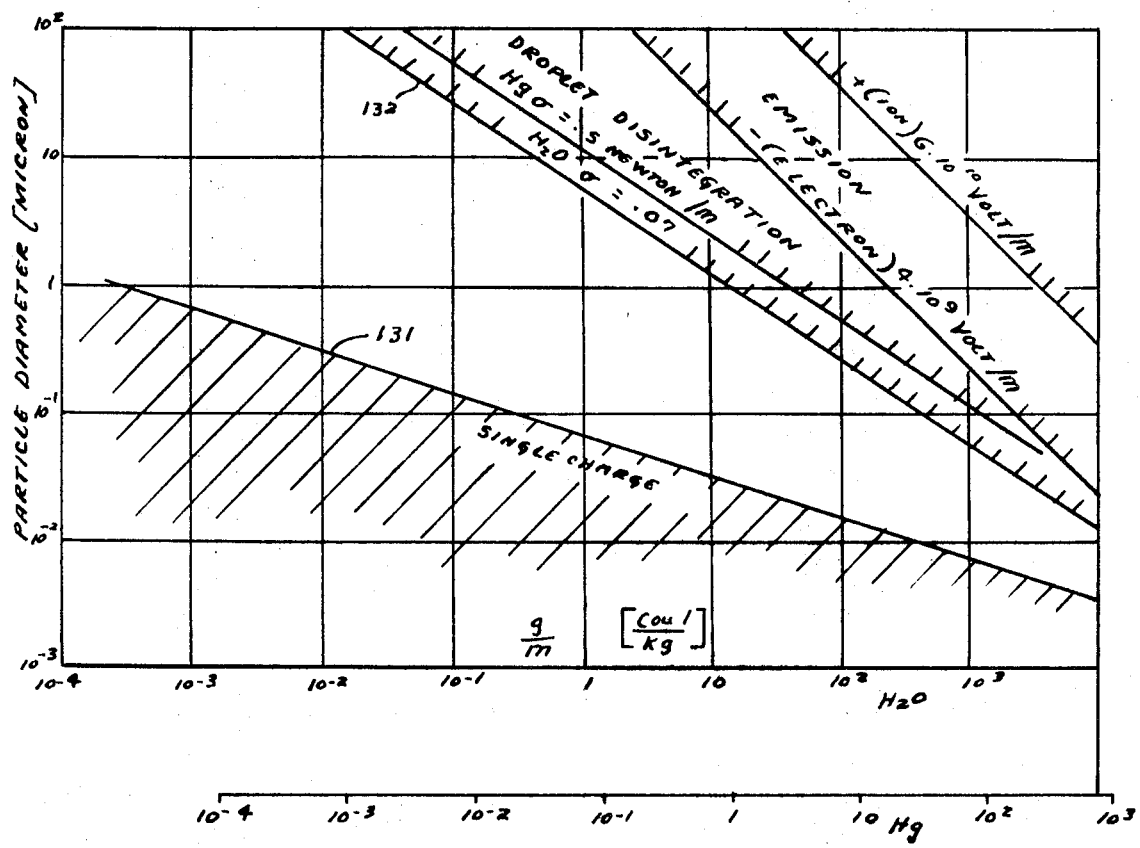
FIG. 13 is a graph showing the limitations for the particle charge-to-mass ratio for ballistic generators.

In the ballistic generator there are two basic limitations in the charge-to-mass ratio of the particle. The first, is obviously the minimum charge cannot be less than the electron charge. This limitation affects essentially only the very small particles. The second limitation is brought about by the fact that the charges on a particle are situated only on its surface. Since the particle mass increases with the third power of the radius and its surface only with the second power, large particles may have an excessive amount of charges on their surface for a given charge-to-mass ratio. When this occurs the surface field strength on the particle can become high enough to cause ion or electron emission destroying the operation. The forces between the electric charges situated on the liquid droplets counteracts the surface tension tending to cause the droplets to disintegrate. The following pertinent equations have been derived to set forth the relationships of charge-to-mass ratio.

a. The single charge limitation follows the simple relation:
$q/m = (6 \cdot q_{el})/(\pi \cdot d^3 \cdot \rho_p)$
or
$\rho_p(q/m) = (6 \cdot q_{el})/\pi \cdot d^3$
where $q_{el}$ is the electron charge of $1.602 \times 10^{119}$ coulomb, $d$ is the particle diameter and $\rho_p$ is the mass density of the particle.

b. The electric field strength $E_s$ on the surface of a spherical particle with charge $q$ is given by:
$E_s = q/(\epsilon \cdot \pi \cdot d^2)$
where $\epsilon$ is the dielectric constant for vacuum, $8.854 \times 12^{112}$ coul/(volt $m$). Introducing the particle mass into this expression yields:
$E_s = \rho_p(q/m)d/\epsilon \cdot 6$.

c. The equivalence between surface tension which tends to contract the surface and the electric forces which oppose this action is expressed by:
$4 \cdot \sigma/d = (\epsilon/2)E_s^2$
where $\sigma$ is the surface tension.
Combining the last two equations
$\sigma = (\rho_p \cdot q/m)^2 \cdot d^3/\epsilon \cdot 288)$.
These limitations showing the defined operating region for ballistic generators is set forth by the region between curve 131 and curve 132 of FIG. 13 (for water).

In the ballistic generator the conversion length that the charged particles traverse has a definite relationship to the generated voltage, as expressed by the basic relation, (in one-dimensional consideration):

$$V = \int_0^h E_x dx$$

where V is the electric potential between electrodes (generator voltage), $E_x$ is the electric field strength at distance $x$ from the entrance electrode, and $h$, the upper integration limit, is the total distance between the entrance and exit electrodes, (the conversion length). For an assumed 25 percent exit loss, as previously stated, $E_x$ very nearly drops in a straight line from its maximum value at the entrance to zero at the exit for optimum power concentration. Thus the generated voltage V may be expressed in terms of electric field strength at the entrance electrode $E_1$ and the distance between electrodes or conversion length $h$ simply as:
$V = (E_1/2)h$.
As will be shown in the following paragraphs the most important factor for the electric power concentration in a ballistic generator is a high entrance field strength. In particular, the power concentration increases with the square of this field strength. Thus, any sacrifice in $E_1$ for the sake of distance $h$ involves great power reductions. Values for $E_1$ must be at least $10^7$ volt/$m$ for reasonable performances. Considering distances from 1 to 50 centimeters as technically tractable, this results in generated voltages in the range of from $5 \times 10^4$ to $2.5 \times 10^6$ volts.

The electric power concentration in a ballistic generator is a function of the forces acting in the conversion region. The current density may be considered only of an incidental nature. Considering no charges present in the electric field between the entrance electrode and exit electrode, then on both electrodes there acts per unit electrode area a force which is according to elementary electrostatic theory:
$F/A = (\epsilon/2) \cdot E^2$
where the field strength E is the same everywhere between the electrodes. With electric charges present in the field, which have the same polarity as the exit electrode, the exit electrode becomes shielded by the space charge from the influence of the entrance electrode, i.e., the charges take over part of the forces previously acting on the exit electrode. When sufficient charges are present, the exit electrode becomes force-free, i.e., the field strength at the exit electrode becomes zero. Then the sum of all the forces acting on the charges is equal to the force acting on the entrance electrode. Thus $E_1$ alone determines the forces which decelerate the particle flow. The change in momentum of the particle flow (mass flow per second, $\dot{m}$) referred to unit electrode area is thus:
$\dot{m}(v_1 - v_2)/A = (\epsilon/2)E_1^2$.
It is now apparent that the limiting factor for the conversion process is the entrance field strength and with it the forces acting on the particle flow. The conversion region is saturated with charges if the field strength becomes zero at the exit electrode. Any additional charges would reverse the forces near the exit electrode.

Using the continuity equation
$\dot{m} = A_1 \rho_{m11} v_1$
where $\dot{m}$ is the mass flow per second, $A_1$ is the particle flow cross section area at the entrance electrode, $\rho_{m11}$ is the mass density of particle flow at the entrance electrode, and $v_1$ is the particle velocity at the entrance electrode, the previous mass flow equation may be written for the mass flow at the entrance electrode:
$(\rho_{m11} \cdot v_1 2/2)(1 - v_2/v_1)2 = (\epsilon/2)E_1$.
This equation expresses the change in momentum in terms of the dynamic pressure of the particle flow at the entrance to the conversion region.

The electric field strength at the entrance electrode $E_1$ is limited by electrical breakdown. Conditions which support high field strength in gaseous media are, as the well-known Paschen curves demonstrate, either a very high pressure or a very high vacuum, it has been found that ballistic generators employing high pressures are more efficient and easier to construct than those employing high vacuums.

The electric power output of the ballistic generator may be expressed:
$A \cdot L = \dot{m} \cdot v_1^2 (1 - v_2^2/v_1)/2$
where L is the electric power density over the particle flow cross section A. From the previous equation
$\dot{m}(v_1 - v_2)/A = (\epsilon/2)E_1^2$
it follows that:
$\dot{m} \cdot v_1 = (A \cdot \epsilon \cdot E_1^2/2)(1 - v_2/v_1)$
and that:
$L = \epsilon \cdot E_1^2 \cdot v_1 (1 + v_2/v_1)/4$
and for a 25 percent exit loss, the power concentration becomes:
$L = \epsilon \cdot E_1^2 \cdot v_1 \cdot \frac{3}{8}$.
Neither voltage or current values appear in the foregoing power concentration calculations. From the generator output voltages previously mentioned it is apparent that the current density in ballistic generators is of the order of a few milliamperes/cm.$^2$. (The power concentrations realizable in practical generators will depend upon the magnitude of the generated voltage which in turn will be determined by the insulation used and the breakdown potentials. In the apparatus described later, generating approximately 300,000 volts, power concentration of the order of 10 watts per square centimeter are obtained. This is with particle velocities of approximately 500 $m/s$, and field strengths of approximately $6 \times 10^7$ volts/$m$. With these same operating parameters and a sufficiently high generated voltage power concentrations of 300 watts/cm.$^2$ appear feasible.)

The arbitrariness of the voltage and current for the power concentration is an obvious consequence of the space charge conditions in the ballistic generator, thus it will be helpful for the understanding of the characteristics of the generator to look into the overall picture of forces in the conversion region. When the exit loss of the conversion process is determined, then the distribution of the field strength, the distribution of the velocity and consequently the distribution of the charge density over the conversion region is determined. Then only one certain amount of electric charge is associated with the forces acting on these charges. Thus, the charge amount and the force on the charges are equivalent criteria for determining the power concentration. For the same power concentration, the charges can be packed more closely in a short channel, i.e., the current can be chosen higher than in a long channel which gives, however, the higher voltage. Thus voltage and current or conversion length and current are interdependent. Due to the limitation of the electrical charge in the conversion region it is readily understandable that the power concentration increases with an increase in particle velocity for a given conversion length since the current is increased by moving the charges faster without changing the amount of charges present in the conversion region at any instant of time.

Figure 12:
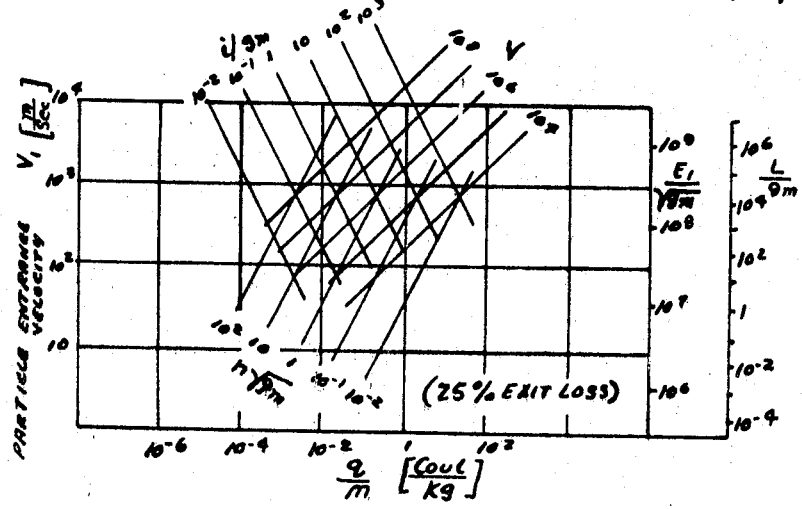
FIG. 12 is a graph showing the typical operating parameters of the conversion chamber of ballistic generators.

The foregoing theory of operation of the conversion chamber may conveniently be expressed in graphical form as shown in FIG. 12. The major parameters involved in the conversion process are: the generated voltage V, the current density $i$, the conversion length $h$, the power density L, the entrance field strength $E_1$, and the particle flow mass density $\rho_m$. The coordinates of the diagram are the particle entrance velocity $v_1$, and the charge-to-mass ratio of the particles $q/m$.

The following condensed derivations of the equations of these parameters will be helpful in applying the data of FIG. 12 to the apparatus subsequently described.

The generated voltage V for an exit velocity $v_2=v_1/2$ may be expressed:
$V=v_1^2/2.67(q/m)$.

The current density $i$ is derived from the charge density $\rho_e$ and the particle velocity $v$ according to:
$i=\rho \cdot v$.
Considering the charge-to-mass ratio equation
$q/m=\rho_e/\rho_m$
the instantaneous particle velocity $v$ may be expressed:
$v=(i \cdot m)/(q \cdot \rho_m)$
and defining $\rho_m$ as the particle flow density averaged between the entrance electrode and the exit electrode so that $v$ is the average velocity between entrance and exit and with the exit velocity equal to one-half the entrance velocity, the entrance velocity may be expressed:

$$v_1 = 1.33 \cdot \frac{i}{\rho_m(q/m)}$$

The relationship of the conversion length $h$ and the entrance velocity $v_1$ is derived from the expression:
$(v_1^2 \cdot m)/(q \cdot 2.67)=(E_1/2) \cdot h$
and from this equation the entrance field strength $E_1$ can be eliminated considering Poisson's equation, which states that the divergence of the field vector is equal to the local net charge density. Thus, considering the one-dimensional case:
$\rho_e=-\epsilon(dE/dx)$
and for a linear field distribution with the field strength zero at the exit, it may be stated:
$|\rho_e|=\epsilon(E_1/h)$.
It then follows that:
$\rho_m(q/m)=\epsilon(E_1/h)$
and with $\epsilon=8.854 \times 10^{112}$ coul/(volt $m$), the dielectric constant for vacuum, the relationship of the major parameters of entrance velocity $v_1$ and conversion length $h$ may be expressed:
$v_1=10^6(q/m)(h \sqrt{\rho_m})$.

The parameters of entrance electric field strength $E_1$ and the entrance velocity $v_1$ have the relationship, with respect to the mass density of particle flow $\rho_m$ of:

$E_1/\sqrt{\rho_m} = v_1 \cdot 10^5 \cdot 2.91$.
This expression is derived from the previous expression:
$(\rho_{m11} \cdot v_1 2/2)(1-v_2/v_1)2=(\epsilon/2)E_1$ by replacing $\rho_{m11}$ with the particle flow density averaged between the electrodes by considering:

$$\frac{\rho_m^{-1}}{\rho_m} = \frac{v_{av}}{v_1}$$

and with
$v_2=v_1/2$.
From the foregoing expression the relationship determining the power density L as:
$L/\rho_m=0.28 \cdot v_1^3$
is obtained.

B. The apparatus of the Embodiments

The foregoing discussion has set forth the theory of operation of the transformation of the kinetic energy to electrical energy in the conversion chamber of the ballistic generator. The apparatus for producing the charged particles, collecting the charges and providing the complete thermodynamic cycle of operation will now be described.

FIG. 1 is a block-pictorial diagram of a complete generating system using a thermoballistic generator. The system and the first part of the ballistic generator must provide to the conversion chamber of the generator, which has previously been theoretically discussed, the desirable size particles having the high speeds and the proper charge to provide a generating system that is an economically feasible source of electric power.

As with conventional generating systems, heat is the primary source of energy. This heat source 1 may be any conventional heat source such as a burning hydrocarbon fuel or a nuclear reactor. Heat energy is conventionally applied to the boiler 2, the superheater 3, and the supercritical boiler 4 to impart energy to the fluid medium used in the thermodynamic system.

In the preferred embodiments of the thermoballistic generating system, steam has been found to be a preferred operating medium. Supercritical steam (a fluid in the transition region between liquid and vapor) containing approximately 0.5 percent (by weight) of colloidal silver particles approximately 0.5 micron in diameter provides the medium for forming the charged particles. Superheated steam mixed with approximately 5 percent (by weight) of hydrogen provides the fillgas mixture used in the generator. The fillgas aids in controlling (a) the fluid flow in the generator, (b) the expansion and condensation processes occurring within the generator, (c) the temperature of the fluid flow and the generator temperature, and (d) the electrical breakdown by providing an insulating sheath around the jets of charged particles. While superheated steam alone may be used as the fillgas, it has been found very desirable to add a lightweight gas such as hydrogen to the superheated steam for the following reasons. The lightweight gas has an inherently high heat capacity. Hydrogen has a specific heat more than 10 times that of air. This is very beneficial in providing the heat necessary for the evaporation of the droplets during the supercritical vapor injection. The addition of the lightweight gas, due to its high specific volume, lowers the kinetic energy density of the fillgas. The kinetic energy of the fillgas does not directly contribute to the conversion process and therefore should be kept low for good overall efficiencies. The lightweight gas due to its high heat capacity, provides improved cooling in the supersonic expansion region of the generator and substantially increases the rate of condensation during the expansion process. In the conversion section of the generator the lightweight gas recirculates within the generator as a cooling medium. Helium is an example of another lightweight gas that may be mixed with superheated steam to constitute the fillgas.

In the preferred fillgas mixture of water vapor and hydrogen, each component contributes with its partial pressure to the pressure of the mixture. Thus for a given fillgas pressure the pressure of the water vapor is slightly lower than it would be for a fillgas consisting of water vapor alone. In the later to be discussed thermodynamic diagrams, for simplicity, water vapor alone is considered. The lowering of the water vapor pressure due to the addition of hydrogen does not deteriorate the action of the generator, in fact, it is helpful in protecting the charged droplets from loss of their charge by conduction during the charging process since the lowering of the pressure of the water vapor lowers its electrical conductivity.

In FIG. 1 the heavy lines represent the closed cycle electrofluid flow and the fillgas flow while the lighter solid lines essentially represent the fluid energy bled from the system to operate the necessary pumps required by the system, and the dashed lines represent the condensate return from the pumps. The boiler 2 heats the colloid containing water and provides steam to the superheater 3, the colloidal particles remaining in the water. The fillgas in line 6, supplied to the thermoballistic generator 7, consists of the superheated steam at a temperature of approximately 390° C and a pressure of approximately 220 atmospheres mixed with hydrogen from line 9 that has been withdrawn from the generator, compressed by pump 10, and cooled in cooler 11. The superheated steam is also used to operate the pumps, free-piston in this embodiment, required in the system.

The high temperature water containing the colloidal silver particles is taken from the boiler 2 by line 12, further compressed (increased in pressure) in pump 13, and heated in the supercritical steam boiler 4 to provide a conductive medium of supercritical steam and colloidal particles of approximately 390° C and 270 atmospheres of pressure. This fluid is conducted to the generator by line 14. Also, a small quantity of high pressure fluid is bled off this line by line 15 to operate the jet pump within the generator for condensate return. The boilers, superheater, pumps, coolers, and condenser used in the thermodynamic system are well-known conventional components. It is also to be understood that conventional valving and controls will be associated with the pumps and fluid flow lines to provide the enumerated fluid temperatures and pressures.

Figure 2:
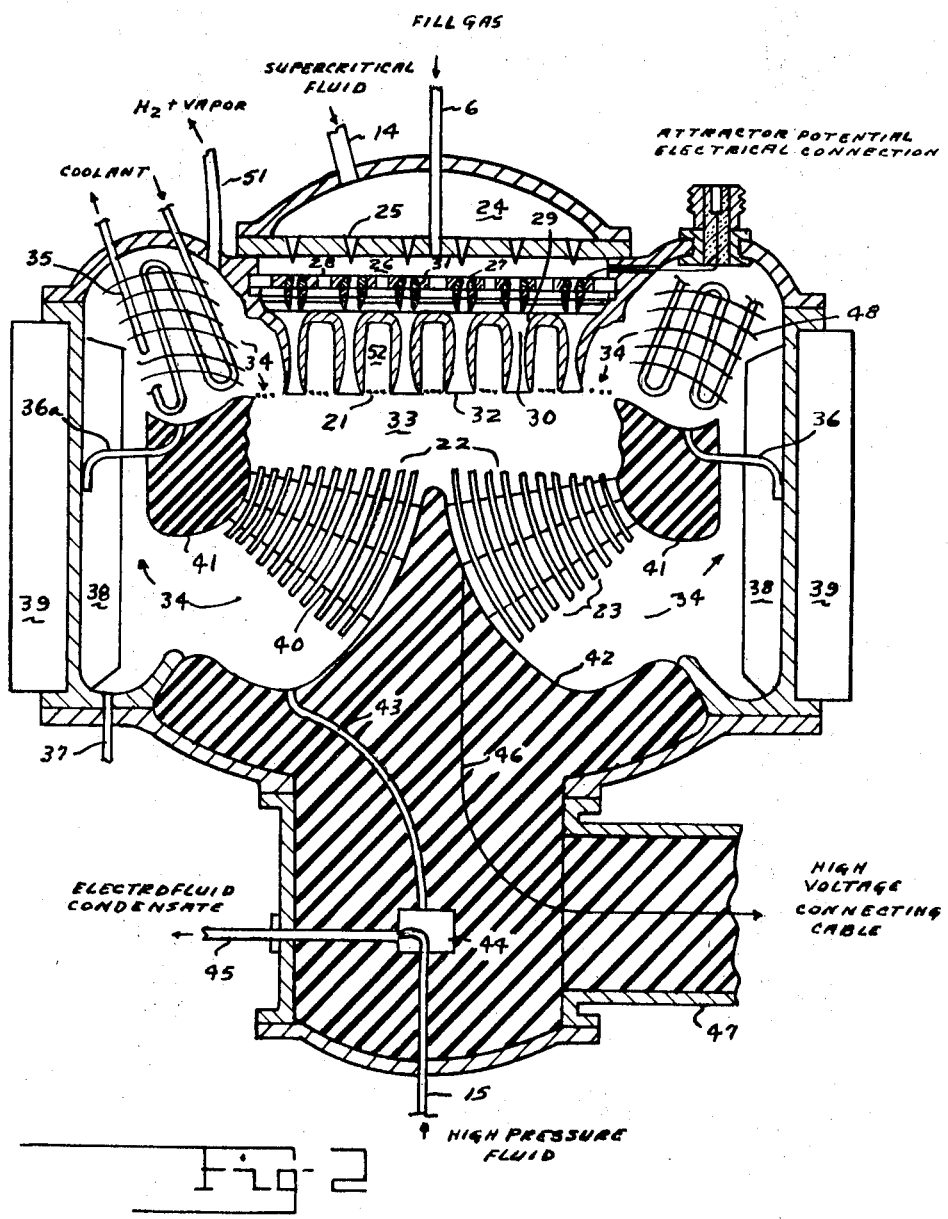
FIG. 2 is a sectional view of an embodiment of a thermoballistic generator having the physical outlines as shown in FIG. 1.

The generator 7 shown pictorially in FIG. 1 is shown in vertical cross section in FIG. 2. The general configurement of the generator is circular in horizontal section. In this specific embodiment being described in detail, the conversion length from the ground screen entrance electrode 21 to the entrance plane 22 of the collector electrode assembly 23 is approximately 1.3 cm. The approximate overall dimensions of the generator are 15 cm. in diameter and 16 cm. high. It produces approximately 100 watts of electrical power at peak potentials approaching $3.10^5$ volts.

The thermoballistic process begins with the supercritical steam containing the silver colloidal particles from line 14 entering chamber 24 and flowing through the ground potential nozzles 25. The nozzles have an opening of approximately 80 microns and discharge into chamber 26. A guide chamber 27 is located in front of each nozzle. The supercritical steam is accelerated and expanded in the nozzle and transforms into a mixture of vapor and water droplets. This transition from the supercritical state to essentially a 50/50 percent water-vapor mixture is completed in the order of about 10 nozzle diameters from the injection nozzle outlet.

Also entering chamber 26 is the fillgas from line 6. About half of the fillgas expands into the guide channels 27 and surrounds the jet streams (from the nozzles) which are in the state of being broken up due to expansion into the wet region. Upon the fillgas contacting the jet fragments, the fillgas causes the evaporation of the jet liquid. The other half of the fillgas entering chamber 26 flows through the openings 28 between the guide channels 27 and joins the expanding flow downstream of the guide channels through concentric inlet slots 29 between the guide channel tips and the supersonic nozzles 30. At the entrance to the supersonic nozzles the fillgas completes the evaporation of the jet liquid and prevents the charged colloid beam from contacting the walls of the supersonic nozzles.

An attractor electrode plate 31 constitutes the first part of each guide channel. In this particular embodiment of the invention for generating a $3.10^5$ volt negative potential for utilization, the attractor electrode plate is charged with a positive potential of approximately 50,000 volts with respect to ground. The attractor electrode potential source may be any conventional direct current source capable of supplying the required potential. The potential on the attractor electrode creates an electric field between the injection nozzles, which are at ground potential, and the attractor electrode plate. The jet flow emerging from nozzles 25 thus becomes negatively charged by induction upon entering this electric field. As previously stated, during the injection process the jet transforms into about 50 percent water droplets and 50 percent vapor. The water droplets are evaporated by contact with the hot fillgas. The charged colloids after this evaporation of the jet liquid are surrounded by a protective layer (sheath) of fillgas as they enter the supersonic expansion nozzles 30. In these nozzles the fillgas augmented by the vapor of the jet medium becomes accelerated to supersonic speed. The nozzles should preferably be designed, as is well known in the art, to provide a flow Mach-number of approximately 1.5. Due to the small size of the colloids, very little slip occurs between the colloids and the expanding gas and by viscous interaction the colloids are accelerated to essentially the flow velocity of the expanding gas. The Mach-number of 1.5 is considered a preferred compromise; it is high enough to provide a good thermodynamic efficiency for the conversion of heat into gas kinetic energy and still is not so high as to lower the pressure in the conversion section to the point that the dielectric strength of the gaseous atmosphere prohibits a compact and efficient generator design. During this expansion, near the critical point, in the supersonic nozzles 30, most of the vapor will condense with the charged colloids serving as very effective condensation nuclei. In this way massive high speed charged particles are produced.

The newly formed, negatively charged, condensation droplets around the colloid nuclei now have the size, velocity, mass, and charge for efficient conversion, in the conversion chamber, to convert their kinetic energy to electrical energy. They, along with any uncondensed portion of the vapor plus the hydrogen leave the nozzle exits 32 and enter the conversion chamber 33. The conversion chamber is bounded by the ground potential screen 21 surrounding the nozzle exits 32 and the plane 22 of the collector electrode assembly 23. The screen 21 is an open grid type structure providing an electrical ground potential plane yet freely permitting the continuous flow of recirculating hydrogen-vapor mixture through the conversion region. The flow cross section offered the charged particles is abruptly increased from that of the nozzle exits to that of the conversion section. Upon entering the conversion section the charged condensation droplets spread out and fill the available cross-sectional area of the conversion space as they travel toward the collector electrode. The increase in cross section is provided to spread the charge carriers over a sufficient cross section to give them the proper kinetic energy density required for an effective electric conversion. Due to the fact that the cross section increase is very abrupt a throttling action instead of an expansion takes place and the pressure level in the conversion section remains practically constant (at approximately 20 atm.) providing an undiminished protection within the generator against electrical breakdown. The sudden spread in the flow cross section from the expansion nozzles to the conversion section requires certain provisions to keep the flow in the conversion section under control. This control is obtained by returning some of the fillgas to the conversion section by the return channel 34. This return is through the grid structure 21 surrounding the exits of all the supersonic nozzles. When hydrogen is mixed with the fillgas, as is preferable, it is primarily the hydrogen that recirculates without need for replenishing, since it does not condense.

Upon entering the conversion section the charged condensation droplets are immediately exposed to the retarding force of the generator field and therefore slowed down converting the ballistic kinetic energy they possessed into electric energy. At the same time gas kinetic energy is being supplied (by viscous action) to the slowing down particles by the gas medium flowing in the conversion chamber. This tends to maintain their velocity (or decrease their rate of slowdown) and thus imparts additional kinetic energy to the charged particles to carry them to the collector electrode against the electric field. Part of the gas kinetic energy of the expansion flow is dissipated to heat on the periphery of the expansion flow where mixing occurs with the return flow coming through the perforated grid entrance electrode into the conversion chamber. This return flow coming through the entrance electrode also tends to prevent any backflow of charged droplets from the mixing zone going to the entrance electrode under the influence of the generator field.

To prevent the evaporation of the charged condensation droplets in the mixing zone, just outside the supersonic expansion nozzles, due to the heat dissipation taking place in the mixing zone, the return flow 34 of the hydrogen and vapor medium is cooled in the condenser 35. This condenser also will condense a part of the vapor phase of any of the operating medium tending to recirculate with the hydrogen and return the condensed vapor, by way of drain tubes 36, 36a, and 37, to the system for reprocessing in the thermodynamic cycle.

Both internal fins 38 and external fins 39 integral with the generator housing further aid in the cooling of the recirculating hydrogen and the condensation of the vapor thus has passed through the collector plates 23. Also due to the fact that the expansion is kept fairly near to critical vapor conditions, an appreciable amount of Joule-Thompson cooling occurs in the expanding flow reducing the external cooling requirements.

At the downstream end of the conversion section is the collector electrode assembly 23. It consists of curved annular conductive members providing collecting surfaces for the charged particles. These conductive members are supported on small conductive rod members 40 which, in turn, are supported by insulating members 41 and 42. Insulating ring member 41 is supported at three points (not shown) directly on bosses on internal fins 38. Insulator 42 sets in and is held in place by the external housing members of the generator. The insulating material used in the generator must be chosen with care. In addition to mechanical stability, the insulator must have a very high ohmic resistance to prevent an appreciable loss of power due to leakage through the resistor, it must also have a high piercing breakdown voltage characteristic, and a high surface or creepage breakdown. For operation of this embodiment of the generator at a voltage of $3.10^5$ volts, it is desirable that the insulation used be suitable for maintaining a field strength of approximately $3.10^7$ volts per meter. Quartz (fused) insulators and stainless steel have been found to be suitable materials from which to fabricate the generator.

The curved shape of the individual surfaces of the collector electrode assembly 23 cause the downward traveling charged droplets to impinge on the surfaces of the electrode transferring their charge to the collector assembly. The discharged water droplets and silver particles flow from the collector surfaces by gravity aided by the circulating gas flow and collect in the ring channel of insulator 42 from which they travel through drain 43 to the jet pump cavity 44. The jet pump operates from the supercritical fluid bled from the supercritical boiler outlet by line 15. The jet pump by its jet action breaks up the water condensate entering the pump from drain 43 into vapor and droplets and thus insulates the condensate water coming from the generator from the ground potential electrofluid condensate return line 45. The charges collected on the collector surfaces travel through the interconnecting conductive support rods to the electrical conductor 46 and thence to the conductor of the connecting high-voltage cable 47.

The noncondensed hydrogen-vapor fluid leaving the collector plates flows through the return channel 34 formed by the housing wall and the insulator ring 41. The cooling fins 38 protruding from the housing wall into this return channel aid in further condensing the water vapor. Drain 37 conducts this condensate, by gravity flow, back into the external thermodynamic cycle. Hydrogen and any remaining water vapor then flows through the condenser 35 which consists of a cooling tube having vertical convolutions wound in ring form between the insulator ring 41 and housing wall of the generator. Fins 48 attached to the condenser tube guide the recirculating gas flow 34 back into the conversion chamber. Any additional water vapor condensed by the condenser 35 is collected in the ring channel in the top of the ring insulator and conducted by gravity flow through tubes 36 and 36a back to the condensate drain 37. Water is a suitable medium for the condenser. Pump 49 (FIG. 1) circulates the cooling medium through the coils of condenser 35 and the conventional external cooler 50.

Hydrogen, and perhaps some remaining vapor, is bled from the downstream side of condenser 35 by return tube 51, compressed by pump 10, further cooled in cooler 11, where additional water containing stray colloids is removed, and primarily hydrogen gas only is returned to the superheated steam line 8 to make up the incoming fillgas in line 6. The amount of hydrogen mixed with the superheated steam is controlled by conventional control of the pump 10.

The cooled hydrogen remaining in the generator after leaving condenser 35 enters areas 52 between the supersonic nozzles 30 and flows through the conversion chamber entrance electrode grid 21 into the conversion chamber to merge with the expansion flow coming from supersonic expansion nozzle exits 32.

Referring both to FIGS. 1 and 2, the reconditioning system for the operating mediz is composed of conventional components. The condensate water collected from the generator is ducted to the external return system through lines 37 and 45. Pump 53, which may be a conventional free-piston pump, pressurizes the condensate water to the fillgas operating pressure and discharges it into boiler 2 where part of the water is evaporated. The steam produced in boiler 2 goes through the superheater 3 where the steam is brought to the fillgas operating temperature. Then, as previously stated, the superheated steam is mixed with the hydrogen from line 9 which has been brought up to pressure by pump 10 and becomes the returning fillgas. In the boiler 2 the colloidal material is separated from the steam going to the superheater 3 by the evaporation process with the colloids essentially remaining in the liquid water in the boiler. Any traces of colloids passing with the steam to the superheater for making up the fillgas are not detrimental to the generator operation. The water used in the entire system is ordinary distilled water having a conductivity, under normal conditions, of about $10_1{}^6$ mho/cm. About 50 percent of the water going to boiler 2 is evaporated and goes to the superheater 3. The other approximately 50 percent of the water going into boiler 2 is taken by the pump 13 and pressurized to the supercritical water injection pressure, (approximately 270 atm.). The supercritical boiler further heats the colloid containing water to the supercritical temperature of approximately 390° C. (In the true sense it is not a "boiler" but merely a "heater.") From the supercritical boiler the water containing colloids pass through line 14 to the generator chamber 24 to be injected again through the injection nozzles 25.

With the exception of the jet pump 44 contained within the generator, all pumps used in the system may be conventional free-piston pumps operated from the superheated steam in line 8 from the superheater. The waste steam from the free-piston pumps is collected and condensed in condenser 54. The compressed hydrogen-steam mixture extracted from the generator by pump 10 is further cooled in the cooler 11 to extract the water which is fed back to the condensate condenser 54 by line 55.

Figure 3:
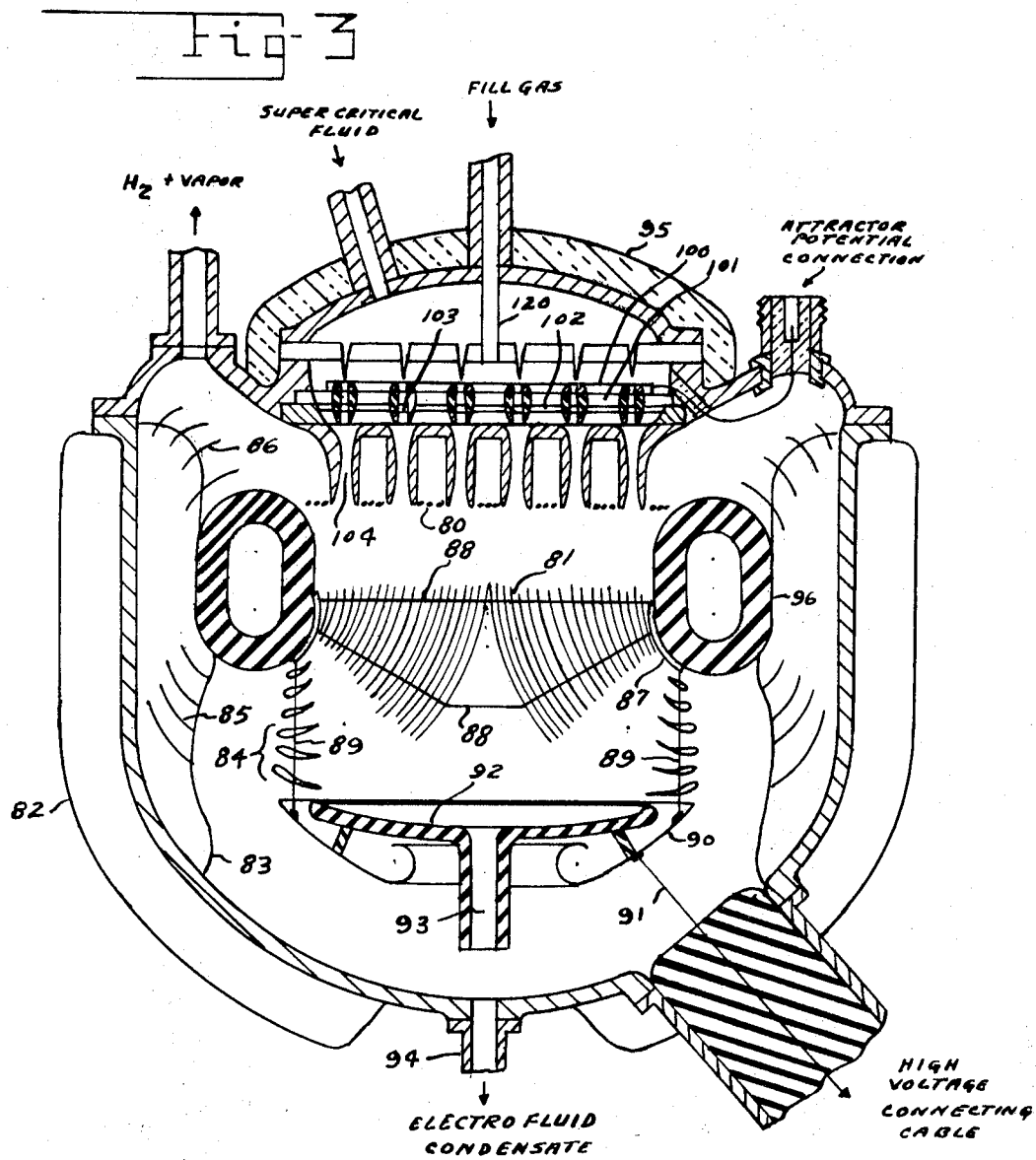
FIG. 3 is a sectional view of another embodiment of a thermoballistic generator.

FIG. 3 shows a vertical section view of another embodiment of a thermoballistic generator. This embodiment functions with the same supercritical electrofluid, the same fillgas, and essentially the same external thermodynamic system as shown in FIG. 1. The attractor electrode potential, and the generated voltage are also the same as in the previous embodiment. The conversion length from the entrance grid electrode 80 to the entrance plane of the collector electrode 81 is approximately 13 mm., the same as in the embodiment of FIG. 2, and the other dimensions of this particular embodiment are shown approximately in corresponding proportion. One of the primary differences in this embodiment of FIG. 3 from that of the embodiment of FIG. 2 is the elimination of the internal condenser 35 with its associated pump and cooler system. In this embodiment of FIG. 3 better heat transfer to the external environment is accomplished by the use of larger and more efficient external fins and internal fins. Whether the internal condenser can be eliminated in a particular generator depends essentially upon the environment in which the generator is situated. Slightly better internal aerodynamic gas flow of the recirculating hydrogen is also obtained with the structure. The flow directing fin type members 84, 85, and 86 aid in this respect.

The electrical insulating member 96 is a hollow annular ring. It is supported by the internal fin members 83. By its being hollow electrical leakage through the body of the insulator is reduced. Ring 87 attached to the insulator 96 supports the collector electrode assembly 81 which is supported by conducting rods 88. Also attached to ring member 87 are vertical conductive rod members 89. Fluid flow guide members 84 are attached to these vertical rods also. At the lower end of the rod members 89 is the spherical dome charge storage member 90. The charged particles from the conversion chamber are collected by the collector assembly 81 as in the foregoing embodiment, however, instead of the charges passing directly to the high voltage cable for utilization, the charges travel by conduction to dome member 90 where by the Faraday cage principle they appear on the outside surface of the dome. The charges thence travel to the outside of the generator by conductor 91. The discharged condensate from the collector assembly is collected by gravity in the saucer-shaped insulator member 92 which is supported within the conductor dome member 90, and further drains by gravity through the tube-shaped opening 93 to the outside shell of the generator where it passes with the other condensate collected within the generator to line 94 which connects directly to the cooler 79 of FIG. 1. The jet pump 44 of the embodiment of FIG. 2 is not needed, nor is the secondary drain 37. In this embodiment of FIG. 3 conventional heat insulating material 95 is applied around the input dome of the generator to improve the thermal efficiency by preventing heat loss.

Figure 4:
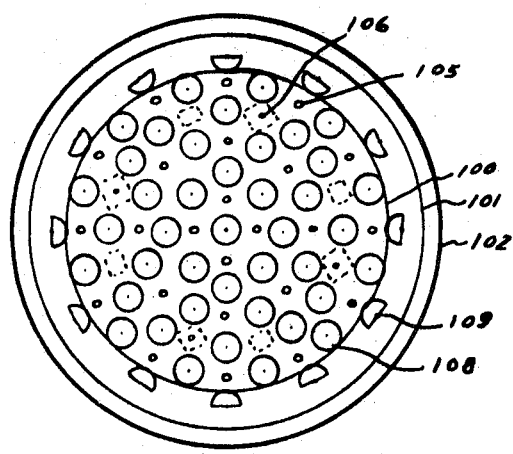
FIG. 4 is a view looking down on the attractor electrode, insulator, and fluid guide channel assembly of the embodiment shown in FIG. 3.
Figure 4A:
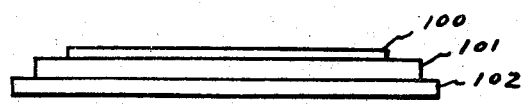
FIG. 4a is a side view of the assembly shown in FIG. 4.
Figure 4B:
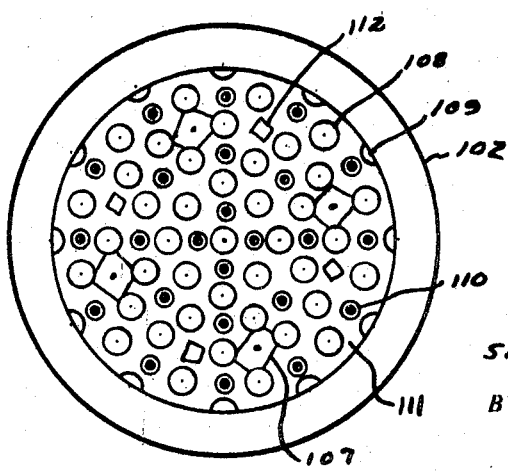
FIG. 4b is a bottom view of the assembly shown in FIG. 4.

FIGS. 4, 4a, and 4b are top, side, and bottom views, respectively, of the assembly comprising the attractor electrode plate 100, the insulator plate 101, and the lower guide channel plate 102. This assembly provides the attractor potential member, forms the guide channels 103 for the jets, and the passages through the assembly for the fillgas so the fillgas may enter the supersonic expansion nozzles 104 surrounding the jet streams.

The embodiments of both FIG. 2 and FIG. 3 have 24 jets and thus there are 24 guide channels and 24 supersonic expansion nozzles. The start of each guide channel 105 commences in the attractor electrode. The guide channels then progress through the insulator 101, which insulates the attractor electrode potential from the ground potential of plate 102. The attractor plate is secured to the insulator plate by four small riveted over rods 106 for which suitable electrical clearance 107 is provided in the metal bottom guide channel plate 102. 41 cylindrical passages 108 and 12 cylindrical section passages 109 are provided through the assembly for the passage of the fillgas. The bottom of each guide channel 110 protrudes from the recessed surface 111 of the lower plate. Four bosses 112 may be used to contact the supersonic nozzle plate for additional structural integrity.

Figure 5:
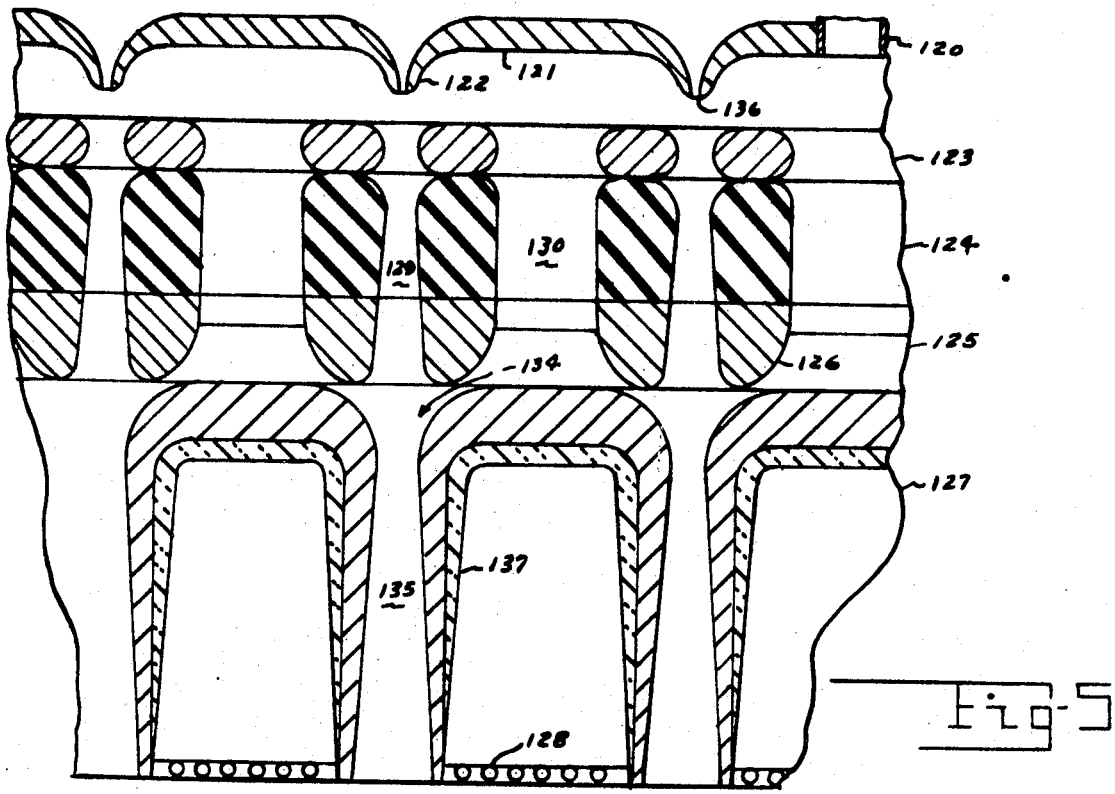
FIG. 5 is an enlarged sectional view of a section of the generator showing the arrangement of the jet nozzles, the attractor electrode, the insulator, the guide channels, the expansion nozzles and the ground potential screen.

FIG. 5 is an enlarged partial section view taken along a horizontal centerline of the generator showing the injection nozzles, the guide channels, and the supersonic expansion nozzles for the first two jet streams to the left of the fillgas passage tube 120 through the jet nozzle plate. (Part of the structure of the third jet to the left is also in the partial section.) This view shows the nozzle plate 121, the formation of the nozzles 122, the attractor electrode plate 123, the insulator plate 124, the lower guide channel plate 125, the protruding lower guide channel tips 126, the supersonic nozzle plate 127, and the entrance electrode grid 128 around the supersonic nozzle exits. It also shows the guide channel geometry 129, the passageways for the fillgas through the guide channel assembly 130, the passageways 134 for fillgas to enter the supersonic expansion nozzles and surround the jet streams, and the supersonic expansion nozzles 135. The jet nozzles 122 have an opening 136 of approximately 80 microns, and the cross-sectional area expansion to accommodate the evaporation of the jet medium, going from the entrance of the guide channels to their exits is approximately two-to-one. The thickness of the plate in which the supersonic expansion nozzles are formed is approximately 13 millimeters. The view of the drawing is approximately to corresponding scale.

It is desirable to apply a conventional heat insulating material 137 such as a conventional asbestos or silicon material to the walls around the supersonic expansion nozzles where recirculating hydrogen and remaining fillgas vapor flows in reentering the conversion chamber to avoid heating the cooled gas. As previously stated, stainless steel is preferred for the metallic components of the generator and quartz (fused) is the preferred insulating materials.

Figure 6:
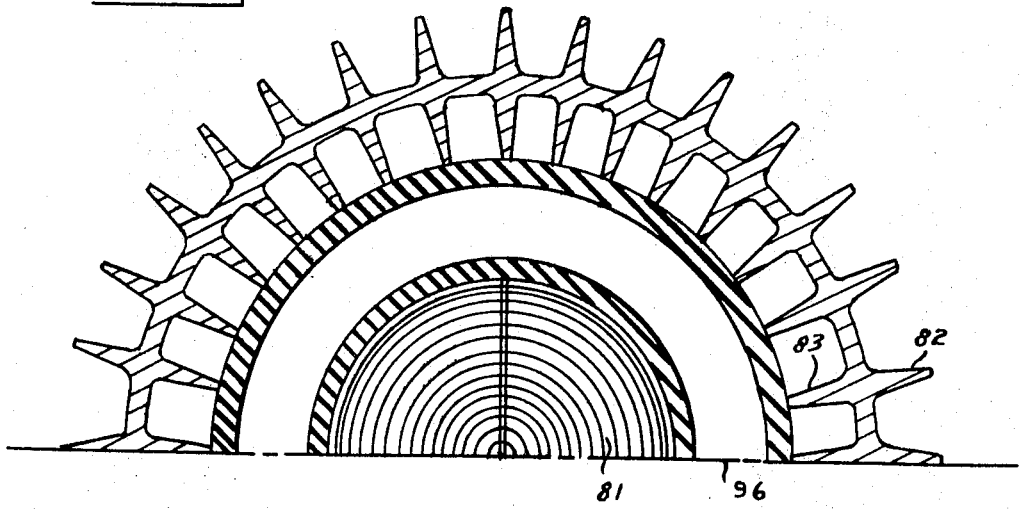
FIG. 6 is a half-section view taken through the embodiment of FIG. 3 at the top of the collector electrode.

FIG. 6 is a half-section view taken horizontally through the generator of FIG. 3 looking down at the level of the top of the collector electrode assembly. This view shows the top (entrance) to the collector electrode assembly 81, the external cooling fins 82, the internal cooling fins 83, and the hollow ring insulator 96.

Figure 7:
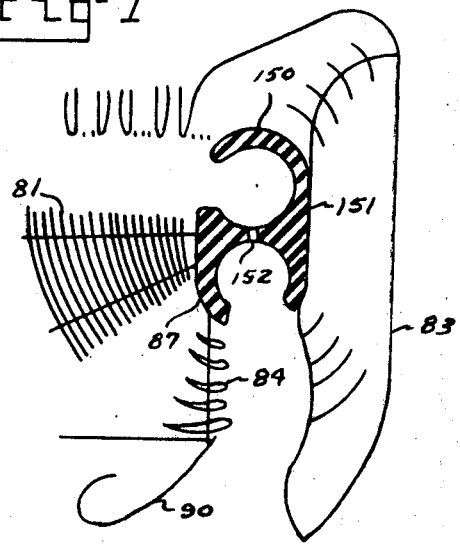
FIG. 7 is a sectional view of an alternative collector electrode insulating support member.

FIG. 7 shows an alternative insulator structure 150 for the insulator shown as a hollow circular ring member 96 in FIG. 3. The insulator performs the functions of providing mechanical support for collector electrode 81, the flow guide vanes 84, the storage dome 90, and the condensate collector insulator 92 (shown in FIG. 3, but not repeated in FIG. 7), and that of defining the inside wall 151 of the recirculating gas passage. The surface of this insulator in contact with the metal ring 87 is at a potential of approximately $3.10^5$ volts. The surface in contact with the internal fins 83 is at ground potential. The insulator has a plurality of drain passageways 152 to provide for any condensate occurring in the upper part of the insulator to pass on through to the condensate return system and not collect in the insulator. This insulator has the advantage of providing a smaller cross section area for electrical leakage thus lower electrical losses within the generator and a longer surface path on the insulator from the high potential to ground thus lower creepage currents on the surface of the insulator. Vortexes of circulating gas within the circular sections of the insulator also aid in preventing deposits on the insulator surfaces and improve the insulation between the high potential area and ground.

Figure 8:
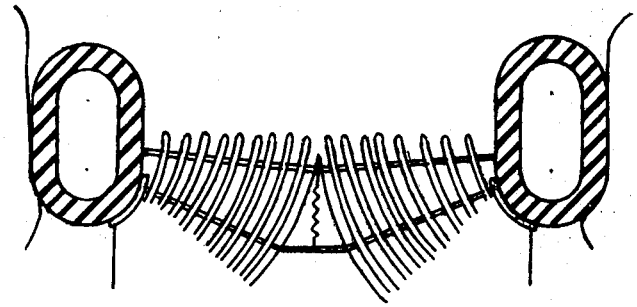
FIG. 8 is a sectional view of a collector electrode arrangement having electrostatic precipitator type action.
Figure 8A:
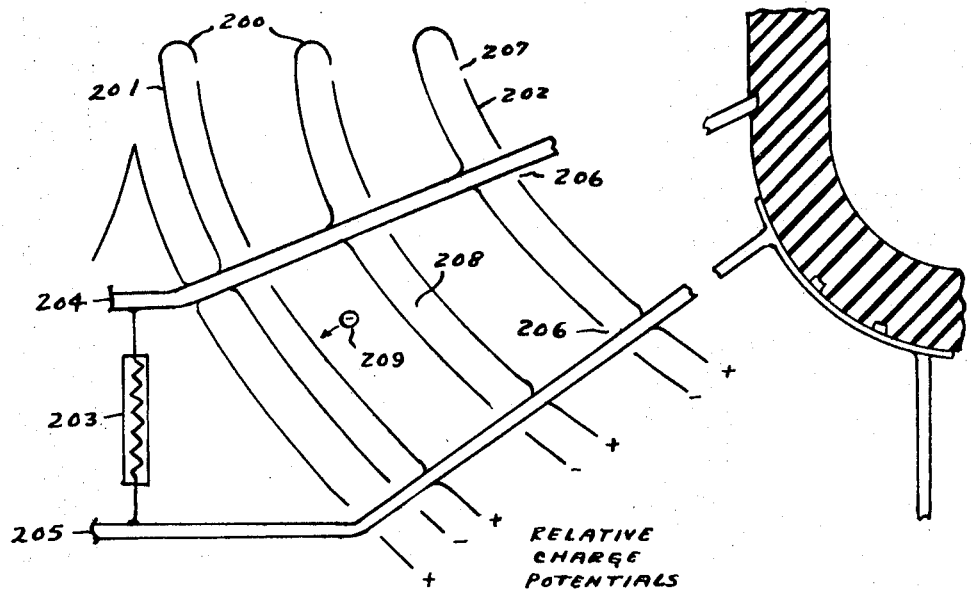
FIG. 8a is an enlarged view showing details of the precipitator construction.

FIG. 8 and FIG. 8a show an alternative collector electrode assembly employing the electrostatic precipitator principle for collecting the charged particles. FIG. 8a is an enlarged partial section-schematic drawing showing the details of the collector assembly. Negatively charged particles leaving the conversion chamber first impinge on the curved surfaces 200 building up a negative charge thereon. Of the total number of negatively charged particles entering the collector electrode assembly, only a small percentage deposit their charges on these surfaces, the majority of the charges enter the assembly. However, due to this first impinging of the charges on the plates 201, having these leading surfaces 200, these plates become slightly more negatively charged than the plates 202. This situation is maintained during the operation of the generator by a voltage drop across the resistance 203. It is to be observed that the higher negatively charged plates are connected by conductive rod 204 and that the less negatively charged plates are connected electrically (and supported by) rod 205. Clearance holes 206 are provided in the plates of one potential around the rods of the other potential. Annular slots 207 between the plates in addition to providing the electrical separation required also permit the free flow of the pressurized fluid. The plates are open at the bottom to permit the drainage of any condensate appearing within the area 208 between the plates. The resistance 203 provides a potential difference between the plates of approximately $10^4$ volts. Negative charged particles 209 by electrostatic precipitator type action are thus driven by the potential fields toward plates 202. That is, they are more strongly repelled by plates 201. This action along with the curvature of gas flow through the collector assembly provides a more efficient collection of the charged particles. It has the disadvantage of considerable more complexity of the collector assembly. (In considering electrical breakdown, it should be borne in mind that 20 atmospheres of pressure exists throughout the assembly.)

Another embodiment of a thermoballistic generator is shown schematically in vertical cross section in FIG. 11. In this embodiment horizontal radial jets are vertically stacked. It has the advantages of high electrical power output in an extremely compact structure. In addition it possesses a high degree of uniformity between the individual jet streams and an ease of structural pressurization. The incoming supercritical fluid containing the silver colloids enters the generator through tube 301 and flows directly to the jets 302. The fillgas enters through the tube 303. Guide channels 304 function as previously stated as do the supersonic expansion nozzles 305. The first part of the guide channels contain attractor electrodes energized through conductor 306. The conversion chamber entrance electrode grid 307 is a vertical cylindrical screen at ground potential surrounding the supersonic nozzle outlets. The collector electrode assembly 308 is a stack of interleaved rings. The electrostatic precipitator principle is employed with alternate collector electrode rings electrically connected by the supporting rods. A voltage dropping resistor 309 establishes a potential difference between the plates as previously explained. The recirculation gas flow 310 is from the cooled housing walls around the insulating ring 311 and thence back through the entrance grid electrode 307. The condensate collects in the bottom of the housing and is returned to the external part of the fluid cycle by tube 312. The high voltage is extracted from the generator by conduit 313.

Silver colloid particles approximately 0.05 micron in diameter such as are obtained from a chemical precipitation process are the preferred colloidal particles, as previously stated. Other finely divided particles of similar size of other metallic conductors such as gold may be used, or finely divided carbon particles of similar size may also be used for the condensation nuclei.

C. The Thermodynamic Action Within the Generator

Figure 9:
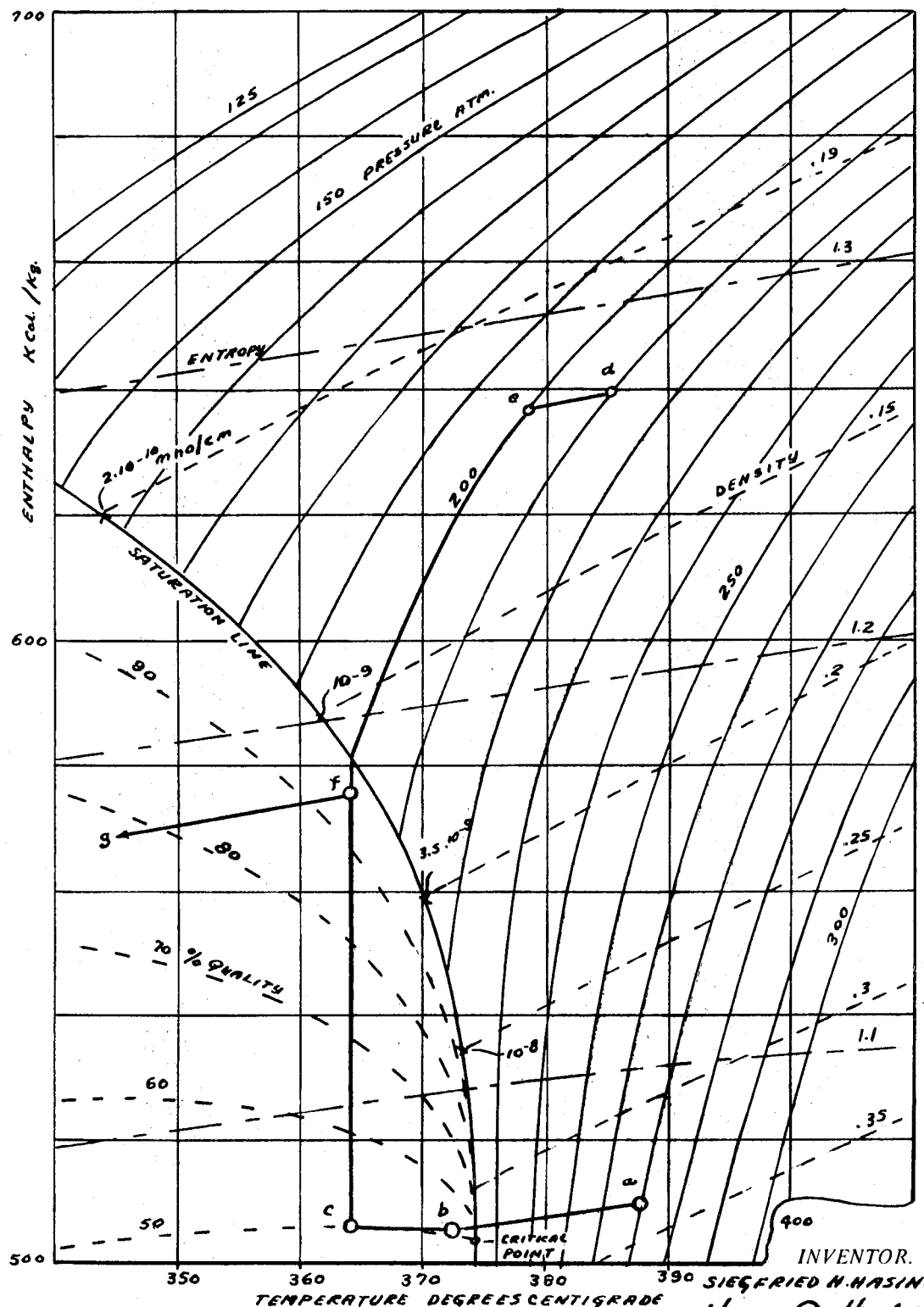
FIG. 9 is a partial plot on an enthalpy-temperature diagram of a typical thermodynamic characteristic of an embodiment of the generator.
Figure 10:
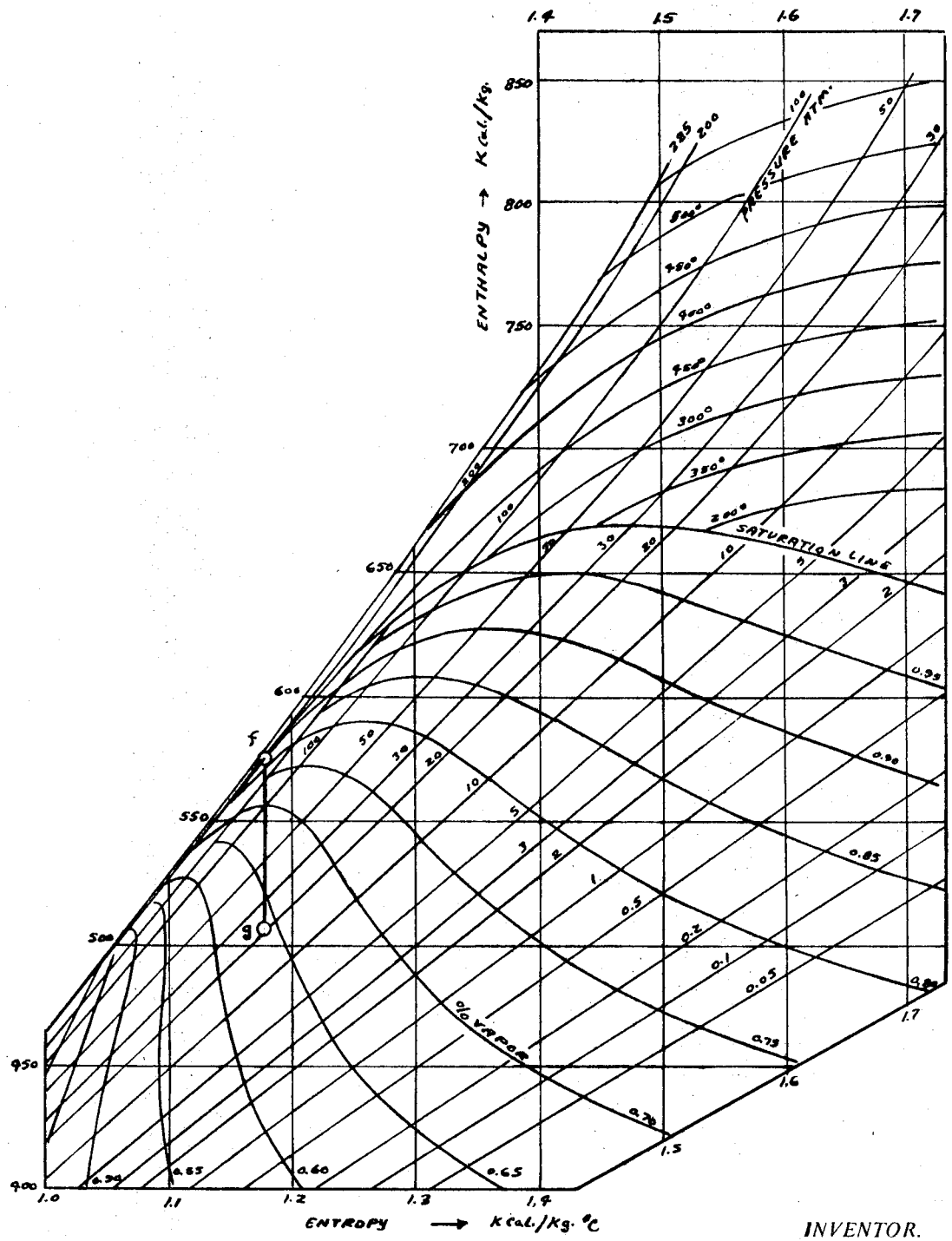
FIG. 10 is a plot on an enthalpy-entropy diagram of a typical adiabatic supersonic expansion occurring in an embodiment of the generator.

The thermodynamic action within the generator may best be understood by reference to the Enthalpy-Temperature diagram shown in FIG. 9 and the Enthalpy-Entropy diagram of FIG. 10. FIG. 9 has, in addition to the conventional lines of constant pressure, constant entropy, constant mass density, and quality, the electrical conductivities of the vapor in mho/cm. plotted along the saturation line.

The supercritical steam (containing the silver colloids) enters the generator with the characteristics indicated by point $a$ in the diagram. The supercritical steam has the properties of a liquid as well as the properties of a gas. This feature is uniquely suitable for efficient operation of the generator. As a gaseous medium it can be expanded and thus a part of its thermal energy can be converted into gaskinetic energy. This allows it to reach comparatively high injection velocities.

A high injection velocity is important for two reasons: (1) the high jet velocity provides a high charge carrying capacity of the liquid jet for a given surface field strength on the jet, and (2) the high speed reduces the spread of the broken-up jet under the given field conditions, which prevents the disintegrated jet from hitting the attractor electrode. As a liquid, the supercritical steam is dense enough to readily carry the colloids in suspension. Thus a high speed conductive jet is produced. The conductivity of the supercritical steam vapor is essentially a function of its density. It decreases very rapidly with a decrease in density. The expansion into the wet region ends at point $c$ on the diagram. The expansion of the supercritical fluid from point $a$ to point $b$ occurs as the fluid leaves the jet nozzle. The expansion from $b$ to $c$ occurs in about 10 nozzle diameters from the injection nozzle outlets. The jet of supercritical fluid meets the incoming fillgas at the time of expansion to point $c$.

In expanding the jet liquid into the wet region along line $a$–$b$– on the diagram, a phase split into about 50 percent water and 50 percent vapor occurs. It is to be observed that the conductivity of the vapor phase at point $f$ near the saturation line is reduced by about two orders of magnitude compared to the conductivity at point $a$. *The conductivity of the liquid phase at point $c$ is, on the other hand, increased over that of point $a$ due to the density increase of the liquid phase. The point representing this state is located at the saturation line below the critical point and not contained in the diagram of FIG. 9. The phase split into the approximately 50 percent water and 50 percent vapor causes the jet to break up into droplets. During this breakup the jet is subject to the electric field of the attractor electrode and the jet fragments will become charged in separating from the conductive jet. This charge will be of the opposite polarity of that of the attractor electrode. In the embodiments of the generator previously described the attractor electrode had a positive charge, thus the jet fragments took on a negative charge and the generated potential of the generator was negative with respect to ground. It is to be understood that the output polarity of the generator may be reversed, i.e., a positive generated voltage may be produced by making the polarity of the attractor electrode negative. Since the transit time of the charged particles from jet nozzles to the collector electrode is much less than a millisecond, effective alternating current may be produced by the generator by applying AC to the attractor electrode.

The vapor phase with its greatly lowered conductivity will act as an insulator between the charged droplets and the guiding walls. Another unique feature of this thermodynamic action concerns the state of the fillgas. Due to the imperfect gas conditions in the vicinity of the critical point, the fillgas in the form of superheated vapor near critical conditions has very high specific heat and provides an ideal heat source for the evaporation of the jet fragments. The supply conditions of the fillgas on entering the generator has the previously enumerated conditions and represented by point $d$ on the diagram. Note that the temperature is almost the same as that of the jet liquid at its supply state (point $a$). A practical advantage of this condition is that the heater for the injection liquid and the fillgas superheater may be combined when necessary for economy or space conditions with very little deterioration of the performance of the generator. If this situation is utilized no thermal insulation is necessary between the supply lines for the injection liquid and the fillgas. From point $d$ to point $e$ the fillgas is expanding to a velocity close to that of the injection jet. This occurs in the first flow of the fillgas into the generator. From point $e$ to point $f$ the fillgas is giving off a comparatively large amount of heat with little change in temperature. This provides the heat source just mentioned. In this embodiment of the generator, the heat given off by the fillgas in going from point $e$ to point $f$ is sufficient to very nearly evaporate an equal amount of injected liquid.

The fillgas contacts the injection liquid at the time of expansion of the fillgas to point $e$. This corresponds in time with the expansion of the injection jet to point $c$. The points $c$ and $e$ generally correspond to the physical entrance of the medium to the guide channels of the generator. The evaporation of the jet fragments takes place essentially from just outside the injection nozzles to the beginning of the supersonic expansion nozzles. That is from just in front of the guide channels through the guide channels. This is represented on the diagram by the progression of the fillgas from point $e$ to point $f$, and by the progression of the injection jet fluid from point $c$ to point $f$. Evaporation of the jet fragments near the critical condition takes place very fast. The evaporation time for a 1 micron size droplet of water at a temperature of 10° C below critical temperature is in the order of $10^{14}$ sec. At the droplet velocities of slightly over 100 m/sec the length of travel of the droplet during this evaporation is slightly less than 1 centimeter.

The expansion of the flow containing the charged colloids in the supersonic expansion nozzles to a Mach-number of about 1.5 commences at the entrance to the supersonic nozzles with the fluid as represented by point $f$ on the diagram of FIG. 9 which corresponds to the point $f$ on the enthalpy-entropy diagram of FIG. 10. This expansion with the pressure changing from about 200 atmospheres to approximately 20 atmospheres is represented on the diagrams from point $f$ to point $g$. In this expansion into the wet region over 50 percent of the water vapor condenses with the charged colloids acting as condensation nuclei. Had not the 5 percent hydrogen been added to the superheated steam in making up the fillgas only approximately 35 percent of the water vapor would have condensed. The difficulties encountered in repressurizing the lightweight gas in the thermodynamic cycle somewhat restricts the practical use of lightweight gas from larger percentages than set forth in the embodiments.

The charged colloids in the expanding flow act as very effective condensation nuclei and allow for the control of the condensation process in the expansion nozzle. They prevent the condensation delay normally present in free vapor condensation (spontaneous condensation). This causes most of the condensation to occur on the charged colloids. Thus the number of colloids present will to a great extent determine the size of the charged particles formed. While it is probably not possible to provide colloids so as to form a larger number of condensation nuclei than the number that would occur in free spontaneous condensation, it is easy to provide them for a smaller number as is done in this invention. With the fewer number of nuclei the condensation droplets become larger than those which occur in normal free vapor condensation. In the present case about two orders of magnitude less colloids will be provided than nuclei are available in the spontaneous condensation condition. Thus under this condition droplets which are about 5 times as large as in spontaneous condensation are formed. This amounts to a droplet size of about 0.5 micron which is a very desirable size for the electroballistic conversion process.

Due to the high pressure and high temperature conditions under which the condensation takes place, the condensation time is extremely short. Droplet growth from the colloid size (0.05 micron) to 0.5 micron occurs in the supersonic portion of the expansion nozzle in a travel length of about 1 centimeter. This calls for the use of relatively short expansion nozzles. This is an important consideration since electrofluid dynamic conversion units are inherently small, a condition dictated by the requirement that the charge carrying medium must have a small diameter in order to allow high charge-to-mass ratios at a tolerable electric field strength.

I claim:
1. A thermoballistic electric generating system comprising:
   a. a source of heat;
   b. water;
   c. means cooperating with the said water and source of heat for providing superheated steam;
   d. electrically conductive colloidal particles;
   e. means cooperating with the said source of heat, the said water, and the said colloidal particles for providing a supercritical fluid containing approximately 0.5 percent by weight of colloidal particles;
   f. a lightweight gas;
   g. means for combining the said lightweight gas and the superheated steam to provide a fillgas comprising a mixture of superheated steam with approximately 5 percent by weight of the lightweight gas;
   h. means cooperating with the supercritical fluid containing colloidal particles for providing a disintegrated jet stream;
   i. means for inductively electrically charging the disintegrated jet stream;
   j. means cooperating with the said charged disintegrated jet stream and the said fillgas for essentially evaporating the charged disintegrated jet stream and providing charged condensation nuclei;
   k. means cooperating with the said condensation nuclei and the said fillgas for accelerating the condensation nuclei to supersonic velocities and forming by condensation around the nuclei charged water droplets;
   l. a conversion chamber bounded on one side by an electrical ground entrance electrode and on the other side by a collector electrode;
   m. means for directing the charged water droplets through the said conversion chamber from the said ground entrance electrode to the said collector electrode; electrically charging the collector electrode; and
   n. means for removing the electrical charge from the said collector electrode.

2. The generating system as claimed in claim 1 wherein the said electrically conductive colloidal particles are finely divided silver particles having a diameter of approximately 0.05 microns.

3. The generating system as claimed in claim 2 wherein the said lightweight gas is hydrogen.

4. The generating system as claimed in claim 3 wherein the said superheated steam is provided at a pressure of approximately 220 atmospheres of pressure and a temperature of approximately 390° centigrade, and the supercritical fluid is provided at a pressure of approximately 270 atmospheres of pressure and a temperature of approximately 390° centigrade.

5. A thermoballistic generator for producing electric energy from the kinetic energies of a source of high temperature, high-pressure supercritical steam containing electrically conductive colloidal particles and a source of high temperature, high-pressure fillgas comprised of superheated steam and hydrogen, comprising:
   a. an injection nozzle for receiving the supercritical water containing the colloidal particles and providing a disintegrated jet stream;
   b. an electrical potential source;
   c. an attractor electrode cooperating with the potential source for electrically charging the said jet stream;
   d. a guide channel;
   e. means cooperating with the said fillgas and the said guide channel for directing the said charged jet stream surrounded by the fillgas through the said guide channel;
   f. a supersonic nozzle cooperating with the said guide channel having an entrance for receiving the said charged jet stream and fillgas flow from the guide channel and providing a flow of charged particles at supersonic velocities at the exit of the nozzle;
   g. an entrance electrode at electrical ground potential positioned at the said supersonic nozzle exit; and
   h. a collector electrode spaced apart from the said entrance electrode for receiving the said charged particles and providing a source of electric energy.

6. The apparatus as claimed in claim 5 wherein the said guide channel provides an expansion of approximately two-to-one.

7. The apparatus as claimed in claim 6 wherein the said supersonic nozzle provides a flow of charged particles at a supersonic velocity of approximately a Mach-number of 1.5 at the exit of the nozzle.